ns Patent Office 3,629,356
Patented Dec. 21, 1971

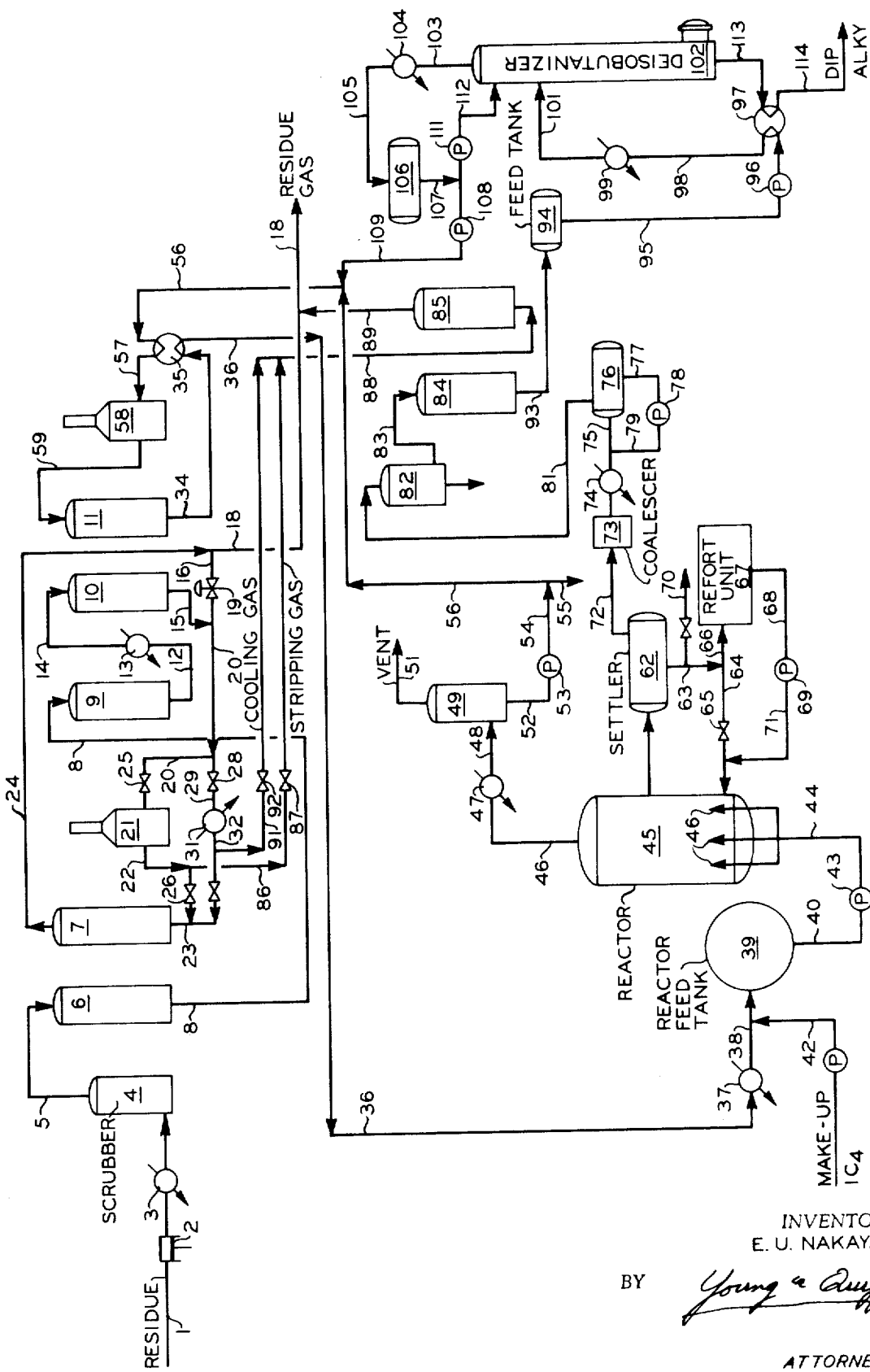

3,629,356
MOLECULAR SIEVE ADSORPTION AND ALKYLATION OF ETHYLENE AND PROPYLENE
Eddie U. Nakayama, Bartlesville, Okla., assignor to Phillips Petroleum Company
Filed Nov. 12, 1969, Ser. No. 875,795
Int. Cl. C07c *3/52, 3/56*
U.S. Cl. 260—683.53  10 Claims

ABSTRACT OF THE DISCLOSURE

A process for the production of alkylate from a refinery residue gas stream. Molecular sieves adsorb ethylene and propylene from the stream, and these in turn are desorbed with an alkylatable hydrocarbon. The mixture is catalytically converted to alkylate in a reactor cooled by evaporation of excess alkylatable hydrocarbon and the latter is recirculated for stripping of additional adsorbed ethylene and propylene.

This invention relates to the production of alkylate. In another aspect, it relates to a process for the conversion of lower hydrocarbons to higher valued isohydrocarbons. Additionally, it relates to an improved process for recovery of ethylene and propylene from refinery waste gases.

Valuable low molecular weight unsaturates are often found as components of many refinery streams, though diluted by, and often found only in economically unattractive proportions in association with, undesired or unreactive components such as hydrogen and saturated compounds.

For example, the residual off-gas from a catalytic cracker contains, inter alia, amounts of potentially valuable low-boiling olefins, the $C_2^=$ and $C_3^=$ unsaturates ethylene and propylene. However, intermingled with and diluted as these components are by relatively non-useful components, the desirable unsaturates are frequently wasted through the refinery residue gas system.

One desirable use of such $C_2^=$ and $C_3^=$ unsaturates is in the production of alkylate for use in the blending of motor fuels, increasingly needed products.

I have discovered and developed a process which recovers $C_2^=$ and $C_3^=$ unsaturates from any refinery stream containing such components, and utilizes such recovered components in the production of alkylate.

BRIEF DESCRIPTION OF THE INVENTION

Essentially, I take a refinery residue gas stream containing minor amounts of ethylene and propylene, such as a cat-cracker residue gas, and utilize molecular sieves to extract by adsorption the valued olefins. The adsorbed olefins are stripped from the molecular sieves by the use of isobutane or other suitable alkylatable isohydrocarbons. The resulting mixture, olefins and stripping fluid, is used directly as feedstock to an alkylation reactor for the production of alkylate. This, in itself, is highly advantageous. All other processes using molecular sieves to extract low olefins desorb with a stripping agent not usable in subsequent alkylation, and hence require an expensive intervening separation step to separate and recover the olefins for use in alkylation. On the contrary, I directly use the stripped mixture as my alkylation reactants. The feed to the reactor can be supplemented with additional isohydrocarbon to maintain a desired high isohydrocarbon to olefin ratio in the reactor.

The reaction in the catalytic alkylate reactor is highly exothermic and requires stringent cooling. In my process, around 40% of the isohydrocarbon is flashed to remove the heat of reaction, and about 10% actually reacts with the olefin to form alkylate. Thus, only about half of the initial feed of isohydrocarbon circulates on with the alkylate product to the succeeding separation steps, rather than as much as 90% as practiced by the prior art in order to maintain the desired high isohydrocarbon to olefin ratio in the reactor. Hence, the sizing of succeeding equipment following the alkylate reactor is substantially reduced by not having to handle so much surplus baggage.

DETAILED DESCRIPTION OF THE INVENTION

In following descriptions, I use ethylene as the primary adsorbed component. It should be kept in mind that both ethylene and propylene are adsorbed; that both are desorbed by the stripping gas; and that both react with the stripping gas to form alkylate. Further, I use isobutane as the exemplary stripping component. However, my process is not limited to the use of isobutane, but can employ isopentane, isohexane, isoheptane, or other alkylatable isohydrocarbons, alone, or in admixture, since such stripping components also react with the desorbed adsorbed components to form alkylate. Also, in my example, the term alkylate primarily refers to diisopropyl, the reaction product of ethylene and isobutane. However, the term alkylate must perforce be broader than this, as will be realized from the aforegoing discussion, and so includes alkylation products of higher molecular weight depending on the character of the reactants.

Referring, now, to my drawing attached, the semi-detailed flow sheet represents an embodiment of my invention starting with an FCC off-gas, utilizing ethylene as primary adsorbed component, isobutane as stripping component, and ending with valued diisopropyl as alkylate. Temperatures and pressures shown are illustrative of the exemplary situation, and should not be limitative of the scope of my invention.

Initial treatment of residue gas stream

The residue gas stream 1, for example from the catalytic cracking of gas oil and topped crudes, is brought into my process at about 80 to 100 p.s.i. and 90 to 110° F. The residue gas 1 is compressed by compressor 2 to about 185 p.s.i. and the consequent heat of compression is removed by cooling the compressed gas in indirect heat exchanger 3 down to about 90° F. at 180 p.s.i. The cooled stream is scrubbed in scrubber 4, a gas-liquid separator wherein any condensed liquids, primarily moisture and higher hydrocarbons, will settle to the bottom and can be drain off periodically.

The scrubbed effluent 5 is dehydrated by molecular sieve dehydrating zone 6 or 7 containing molecular sieves having a pore diameter of about 3 A. These molecular sieves have the ability to remove substantially all of the moisture from the stream, without removing other components. Normally, two or more beds of moisture adsorbing molecular sieves are used, operating out of phase, so that at least one continues to function to dehydrate the residue stream while alternate units are being stripped of adsorbed moisture. In my drawing, molecular sieve adsorption bed 6 is shown in use for dehydration, while unit 7 is shown on line for desorption as discussed hereinafter. Of course, the type of initial treatment of entering stream 1 may vary with the source and composition of the stream. If the stream is dry, for example, the drying step can be omitted.

Adsorption of ethylene on molecular sieves

The dehydrated gas 8 is conducted to adsorption beds 9, 10, or 11 for adsorption of the ethylene and propylene content of the stream. These molecular sieve beds 9, 10, 11, contain molecular sieves with a pore diameter of about 4 A. which have the ability to selectively adsorb primarily the olefins $C_2^=$ and $C_3^=$. Normally, at least dual parallel beds are used, operating out of phase, so that the process can operate substantially in a continuous fashion, and to minimize temperature and composition surges of all bed exits streams. The desorbed bed is hot and requires cooling before being put in adsorption service. To do so the effluent 12 from bed 9 in adsorption service is cooled, such as by heat exchanger 13, before being taken by conduit 14 to bed 10 for use in cooling bed 10. Bed 9 is shown in adsorption operation, bed 10 is shown in bed cooling operation, and bed 11 is shown in stripping or desorption operation.

The nature and character of various types of molecular sieves are discussed in detail by D. W. Breck in his article "Crystalline Molecular Sieves" appearing in 48 J. Chem. Ed. 678 (1964). Another useful reference is the paper by T. L. Thomas, "Molecular Sieves in Petroleum and Natural Gas Processing," presented at the Sixth World Petroleum Congress in Frankfort, Main, June 26, 1963.

The components not adsorbed by the 4 A. molecular sieves in adsorption beds 9, 10, 11 are exited 15 and normally discharged to the plant residue waste gas system via conduits 16, 17, and 18. Conduit 16 is controlled by valve 19 so that the exit waste stream 15 can be shunted in whole or in part through line 20 to strip or desorb the 3 A. molecular sieve moisture adsorption beds 6 or 7.

Desorption of moisture adsorbed molecular sieves

Normally, exit stream 15 at about 300° F. average temperature requires additional heating in order to be used in stripping or desorption of adsorbed moisture from the 3 A. molecular sieves. Therefore, stream 15 is taken by line 20 to a heater 21, such as a furnace or steam heat exchanger, where the temperature of the gas is raised to at least about 400° F., then conveyed by means of lines 22 and 23 to either bed 6 or 7, whichever is to be stripped. The effluent from the bed 7 being stripped is conducted to the plant waste gas system 18 by lines 24 and 17.

Before desorbed bed 7 can be returned to service, it must be cooled. This is readily accomplished by again utilizing the stream 15 of unadsorbed gases from ethylene adsorber 10. For cooling, valve 26 in the line connecting lines 22 and 23 is closed, and the flow through the heater 2 is shunted to other requirements and uses, such as stripping dehydrating beds 84 or 85, hereinafter discussed. Valve 28 in line 29 is opened, thus admitting the waste gas from line 20 to indirect heat exchanger 31 where the gas is cooled down to about 90° F. at 90 p.s.i. Valve 33 in line 32 is opened admitting the cooled gas to line 23 to enter and cool the stripped bed 7. The gases are then exhausted 24 to waste at about 80 p.s.i. via waste lines 17 and 18.

Stripping and recovering ethylene

When one of the ethylene adsorbing beds 9, 10, or 11 approaches its capacity of adsorbed ethylene, the ethylene is recovered for processing. The adsorbed ethylene is desorbed or stripped from bed 11 by use of heated isobutane. The isobutane stream 56 is obtained from the auto-refrigeration of reactor 45 as well as from separation from alkylate in deisobutanizer 102, both as hereinafter described.

The isobutane, in order to be useful in the stripping of ethylene from one of the adsorber beds 9, 10 or 11, must first be heated. Therefore, the isobutane 56 is partially heated in indirect heat exchanger 35 by indirect heat exchange with the stripped admixture stream 34 from the adsorber bed 11 being stripped. Then, the partially heated isobutane 57 is further heated 58, such as in a furnace, to about 400° F. The heated isobutane 59 is used to desorb whichever adsorber bed is to be stripped, here shown as adsorber 11. The hot isobutane strips the adsorbed ethylene and the exiting admixture 34 of stripping isobutane and stripped ethylene at about 265° F. and 168 p.s.i. then ultimately becomes feed to the alkylation reactor 45. The effluent admixture stream 34 is cooled in heat exchanger 35 for indirect heat exchange with the incoming stripping isobutane 56. The partially cooled admixture 36 normally is further cooled by an additional indirect heat exchanger 37 down to about 90° F. The cooled admixture 38 is conducted to a reactor feed tank 39 for storage until needed in the alkylate reactor 45. Additional make-up isobutane, if needed, is added by pump 41 through line 42, either into make-up line 38 to the feed tank 39, or directly to the reactor feed tank 39. Optionally, make-up isobutane can be added to the stripping gas line 56, 57, 59, or elsewhere where suitable.

Alkylation process-reactor cooling

As required for alkylate production, the admixture 40 of ethylene and isobutane is withdrawn from feed tank 39 by pump 43 pumping through line 44 into the catalytic reactor 45 through spray nozzles 46, spraying into fluid aluminum halide, preferably aluminum chloride, catalyst complex. The feed mixture thereby is catalytically combined to form the desired alkylate. Further description of a useful aluminum halide alkylation process is obtained in such references as United States Letters Patent 3,409,389 to C. R. Ringham.

Effective cooling of the highly exothermic alkylation reaction mixture in reactor 45 is obtained by evaporating or vaporizing much of the excess isobutane in auto-refrigeration cooling. The vaporized isobutane is withdrawn from reactor 45 as an overhead 46, cooled by heat exchanger 47, and then conducted by line 48 to be accumulated in accumulator 49. Any non-condensables are vented from the accumulator 49 by vent line 51. The vent line 51 can, if desired, be tied in with the plant residue gas system 18.

As needed for operations, the isobutane in accumulator 49 is withdrawn through conduit 52 by pump 53 and recycled as needed to the reactor 45 via conduits 54 and 55 as part of the reactor make-up isobutane 42. Or, the withdrawn isobutane 54 can be cycled as needed via line 56 and used in stripping of molecular sieve beds 9, 10, 11 for recovery of adsorbed ethylene, as hereinbefore described.

Separation and recovery of alkylate

After vaporization of a portion of the isobutane by auto-refrigeration of reactor 45, the remaining contents of reactor 45 principally include remaining isobutane, desired alkylate, and catalyst complex. The contents are removed by conduit 61 to a settler 62, where the catalyst complex settles out. Any excess catalyst complex buildup is drained to a catalyst disposal system through drain line 70. The catalyt complex is either returned to reactor 45 by lines 63 and 64, or in part by lines 63 and 66 to a catalyst refortification unit 67. From the refortification unit 67, catalyst is returned by line 68 and catalyst pump 69 to line 71 to the reactor catalyst return line 64. Valve 65 in catalyst return line 64 can be wholly or partly closed in order to control the flow of catalyst to the refortification unit 67 as desired.

The settler 62 overhead hydrocarbon effluent 72 is passed through a coalescer 73, then cooled by heat exchanger 74, and conducted by line 75 to washer 76. The hydrocarbon stream is washed with caustic in caustic washer 76. Caustic is separated and withdrawn from caustic washer 76 through line 77 and recycled by pump 78 through line 79 to be premixed with the incoming hydrocarbon stream 75.

The effluent hydrocarbon stream 81 from the caustic washer 76 is normally filtered 82, such as by a sand filter. The filtered stream 83 is dehydrated with molecular sieves in molecular sieve zones 84 or 85. In my drawing molecular sieve bed 84 is shown on line for dehydrating stream 83. Bed 85 is shown in position to be stripped or desorbed. For desorption, hot stripping gas is brought from heater 21, such as a furnace, to bed 85 through lines 22 and 86 by opening valve 87. Stripping gas and desorbed moisture are exhausted by line 89 to the plant waste gas system 18. After being stripped, bed 85 is cooled by shutting off the flow of stripping gas. Valve 87 is closed in line 86, and valve 92 is opened in cooling gas line 91, so that cooling gas then flows through line 88 to bed 85 and ultimately to exhaust through lines 89 and 18.

The dried hydrocarbon stream 93 from the moisture-adsorbing unit 84 is conducted to a deisobutanizer feed tank 94 by pump 96 and partially heated in heat exchanger 97 in indirect heat exchange with hot alkylate effluent in line 113 from debutanizer 102 in order to preheat hydrocarbon stream 98 to the deisobutanizer 102.

The partially heated hydrocarbon stream 98 is heated further in indirect heat exchanger 99 and then conducted by line 101 to the debutanizer 102 for separation. The debutanizer 102 overhead product 103 is primarily isobutane and is cooled by indirect heat exchange in heat exchanger 104 and then taken by line 105 to be accumulated in accumulator 106. From there, the isobutane is returned as needed by line 107 to be used in desorption of ethylene from an adsorption bed via pump 108 and line 109 to line 56. Of course, if desired, such isobutane can be recycled in whole or part to the reactor isobutane make-up line 42. Alternatively, some or all of the isobutane 107 is recycled by pump 111 and line 112 from the accumulator 106 to the deisobutanizer 102, so as to balance continuous fluid-flow operation within the deisobutanizer 102.

The deisobutanizer 102 kettle product 113 is the valuable alkylate product. Alkylate is conducted by line 113 to be cooled by indirect heat exchange in heat exchanger 97 with the aforesaid feed 98 to the deisobutanizer 102, and then is sent to blending or other requirements by means of line 114, such as for blending into motor fuel stocks.

Exemplary material balance

To further illustrate the process of my invention as described in the embodiment shown on the attached flow sheet, a material balance follows for a typical process using a fluid catalyst cracking effluent gas.

The description and material balance preceding exemplify the use of a residual off-gas stream from a fluid catalytic cracking unit, the effective adsorptive extraction of $C_2^=$ and $C_3^=$ olefins and the relative non-adsorption of saturates, the desorption of ethylene and propylene by isobutane as an alkylatable hydrocarbon, and the use of the desorption admixture in the production of alkylate. By my process, there is no need to separate the desorbed $C_2^=$ and $C_3^=$ olefins from the stripping component, as I use the admixture of stripper component and stripped component as the make-up to the alkylation reactor. The latter is effectively cooled by evaporation of excess stripper component, which, in turn, is recycled for olefin desorption. Effective use is made of non-adsorbed components throughout my process in dehydrating moisture adsorbing beds.

The foregoing show the effectiveness and value of my process. Reasonable variations and modifications of my invention are possible within the scope of my disclosure, without departing from the spirit and scope thereof as disclosed in the specification hereinabove and the claims hereinafter.

MATERIAL BALANCE FOR EXTRACTING AND ALKYLATING ETHYLENE FROM REFINERY RESIDUE GAS

| | Stream 8 treated residue gas | Stream 15 adsorber residue | Stream 59 adsorber stripping vapor | Stream 34 adsorber stripped vapor | Stream 34 less 59 adsorbate | Stream 42 make-up Iso-C4 | Stream 44 reactor charge | Stream 72 reactor liquid effluent | Stream 46 reactor vapor effluent | Stream 52 reactor overhead accum. liq. | Stream 51 reactor overhead accum. vapor | Stream 109 deiso. C4 overhead product | Stream 114 alkylate product |
|---|---|---|---|---|---|---|---|---|---|---|---|---|---|
| H2 | 22,951 | 22,951 | | | | | | | | | | | |
| N2 | 3,092 | 3,092 | | | | | | | | | | | |
| CO | 402 | 402 | | | | | | | | | | | |
| C1 | 8,336 | 8,219 | | | 117 | | | | | | 117 | 11 | |
| C2= | 4,353 | 1,088 | 81 | 3,385 | 3,265 | | | | 187 | 70 | 49 | 23 | |
| C2 | 5,582 | 5,215 | 120 | 1,689 | 367 | | | | 146 | 97 | 367 | 303 | |
| C3= | 343 | 105 | 1,322 | 238 | | | | | 1,386 | 1,019 | | | |
| C3 | 260 | 260 | | 238 | | 13 | | 11 | | | 11 | | |
| C4= | 155 | 155 | 162 | 162 | | 4,270 | | 23 | 108 | 97 | | 66 | |
| iC4 | 55 | 55 | | | | 165 | | 303 | | | | | |
| nC4 | 146 | 146 | 28,984 | 28,984 | | 4,448 | 33,254 | 16,601 | 13,199 | 12,545 | 654 | 16,437 | 166 |
| Alky | 0 | 0 | 270 | 270 | 3,087 | 288,247 | 435 | 264 | 171 | 165 | 6 | 105 | 157 |
| | | | 468 | 468 | 114,686 | 1,311 | 468 | 3,454 | 468 | 465 | 3 | | 3,454 |
| Total, mole/D | 45,675 | 41,688 | 31,407 | 35,394 | 3,087 | 4,448 | 39,842 | 20,723 | 15,665 | 14,458 | 1,207 | 16,945 | 3,777 |
| Pounds/day | 614,146 | 499,460 | 1,791,855 | 1,906,541 | 114,686 | 288,247 | 2,164,787 | 1,283,777 | 871,010 | 817,912 | 53,098 | 973,943 | 319,834 |
| MCFD | 17,335 | 16,470 | 9,179 | 10,017 | 838 | 1,311 | 11,328 | 6,359 | 5,945 | 4,204 | 458 | 4,975 | 1,384 |
| Barrels/day | | | | | | | | | 4,521 | | 317 | | |

I claim:
1. A process for the production of alkylate from a gas stream containing at least a minor amount of at least one of ethylene and propylene, which comprises:
   (a) passing said gas stream through a contacting zone containing molecular sieves having a pore diameter of from about 3.5 A. to about 4.5 A. under adsorption conditions and thereby selectively adsorbing onto said molecular sieves at least a major portion of said at least one of ethylene and propylene, and passing out of said contacting zone the unadsorbed residual gases of said gas stream,
   (b) passing a stripping stream consisting essentially of at least one alkylatable hydrocarbon through said contacting zone under stripping conditions and thereby substantially stripping said ethylene and propylene from said molecular sieves,
   (c) withdrawing from said contacting zone a reactor feed stream consisting essentially of said ethylene and propylene and said at least one alkylatable hydrocarbon,
   (d) feeding said reactor feed stream to an alkylation reactor in the presence of an alkylation catalyst under alkylation conditions and thereby converting said ethylene and propylene together with at least a portion of said alkylatable hydrocarbon to alkylate, and
   (e) recovering said alkylate as a product.

2. A process according to claim 1 wherein said stripping stream is selected from at least one of isobutane, isopentane, isohexane, isoheptane, and mixtures of at least two thereof.

3. A process according to claim 2 wherein said gas stream is a catalytic cracker off-gas stream, and said stripping gas is isobutane.

4. A process according to claim 1 wherein said gas stream is a refinery gas stream; wherein in said step (a) passing of said gas stream through a contacting zone is periodically ceased prior to said step (b); and wherein said step (e) comprises the steps of separating the conversion products from said alkylation reactor into a recycle catalyst component, a recycle stream containing substantially unreacted said alkylatable hydrocarbon, and said alkylate as a product.

5. A process according to claim 4 wherein in said step (d) said alkylation reaction conditions include cooling of said alkylation reactor by evaporation of a substantial portion of alkylatable isoparaffin contained in said reactor, and wherein said evaporated alkylatable isoparaffin is withdrawn from said reactor and recovered.

6. A process according to claim 5 wherein said evaporated alkylatable hydrocarbon withdrawn from said alkylation reactor is cooled and recycled to at least one of said step (b) as at least a portion of said stripping stream and said step (d) as a further portion of said feedstock, and wherein said recycle stream is recycled to at least one of said step (b) as at least a portion of said stripping fluid and said step (d) as a further portion of said feedstock.

7. A process according to claim 6 wherein said alkylation catalyst is an aluminum halide complex, and wherein said alkylatable isoparaffin is selected from at least one of i-$C_4$ and i-$C_5$.

8. A process according to claim 7 wherein the said separating step (e) is accompuished by substeps comprising:

settling out said aluminum halide complex from remaining reaction component comprising an overhead hydrocarbon gas stream comprising said recycle stream and said alkylate,
   washing said overhead hydrocarbon gas stream in a caustic washer, filtering said washed stream, drying said filtered wash stream,
   fractionating said dried filtered washed stream into said recycle stream and said alkylate.

9. A process according to claim 6 wherein in said step (a) said gas stream is a dehydrated gas stream and said step (a) is preceded by steps comprising:
   compressing said gas stream to an elevated pressure, thereby producing a hot compressed gas stream,
   cooling said hot compressed gas stream, thereby producing a cooled compressed gas stream containing therein a minor amount of entrained condensate,
   passing said cooled compressed gas stream containing said entrained condensate through a gas-liquid separator wherein said condensate is substantially retained and said cooled compressed gas stream is passed therethrough, and
   passing said cooled compressed gas stream through at least one moisture adsorption zone containing molecular sieves having a pore diameter of from about 2.5 A. to about 3.5 A. wherein said molecular sieves substantially dehydrate said cooled compressed gas stream and pass therethrough said dehydrated gas stream as the gas stream to said step (a).

10. A process according to claim 9 wherein in said at least one moisture adsorption zone is periodically regenerated by substeps comprising:
   periodically ceasing the flow of said cooled compressed gas stream,
   heating said residual gases from said step (a),
   passing said heated residual gases through said moisture adsorption zone thereby substantially desorbing adsorbed moisture from said moisture adsorption zone and leaving a hot desorbed adsorption zone,
   exiting from said hot desorbed adsorption zone said residual gases together with said desorbed moisture as a combined stream to waste,
   cooling said residual gases from said step (a),
   passing said cooled residual gases through said hot desorbed adsorption zone and thereby cooling said desorbed adsorption zone,
   exiting from said cooled desorbed adsorption zone said residual gases as a waste stream,
   returning said cooled desorbed adsorption zone to service as said at least one moisture adsorption zone.

References Cited
UNITED STATES PATENTS

| | | | |
|---|---|---|---|
| 2,906,795 | 9/1959 | Ballard et al. | 260—683.43 |
| 2,946,832 | 7/1960 | Vermilion, Jr. | 260—683.43 |
| 3,078,321 | 2/1963 | Van Pool et al. | 260—683.49 |
| 3,251,902 | 5/1966 | Garwood et al. | 260—683.43 |
| 3,259,669 | 7/1966 | Beavon | 260—683.43 |

DELBERT E. GANTZ, Primary Examiner

G. J. CRASANAKIS, Assistant Examiner

U.S. Cl. X.R.

260—683.43